Jan. 10, 1939.    J. GOTTLIEB    2,143,551
BEARING
Filed April 8, 1937
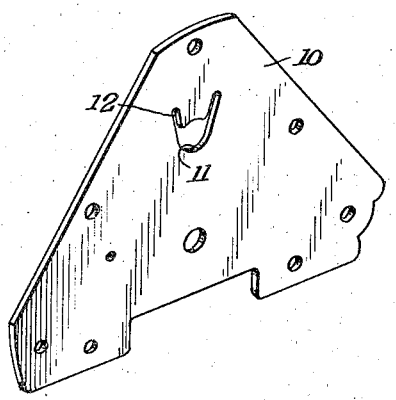
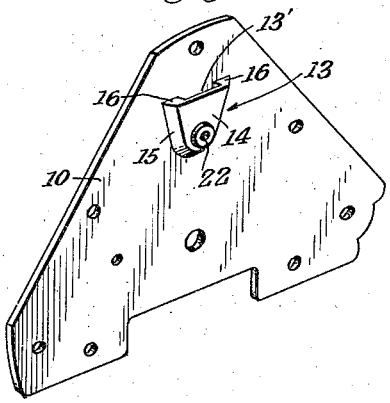
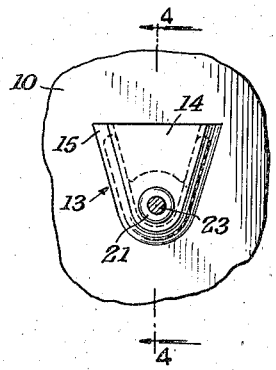
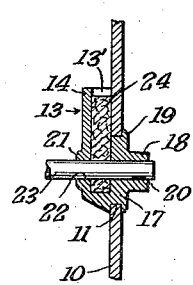
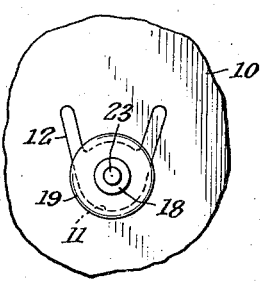
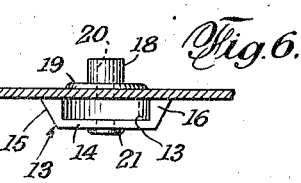
INVENTOR
JOSEPH GOTTLIEB
BY
ATTORNEYS Patented Jan. 10, 1939

2,143,551

UNITED STATES PATENT OFFICE 2,143,551

BEARING

Joseph Gottlieb, Jersey City, N. J.

Application April 8, 1937, Serial No. 135,626

2 Claims. (Cl. 308—121)

My present invention relates to bearings and aims to provide a device of the character indicated which is simple in construction, easy and economical to fabricate, and highly efficient in assuring lubrication to the shaft, journalled therein.

In the accompanying specification, I shall describe and in the annexed drawing show an illustrative embodiment of the bearings of the present invention. It is, however, to be clearly understood that I do not wish to be limited to the exact details herein shown and described for purposes of illustration only, inasmuch as changes may be made therein without the exercise of the inventive faculties and within the scope of the claims hereto appended. For example, the aforesaid illustrative embodiment of the bearings of the present invention need not necessarily have the same shape as specifically set forth; it may not be cast in the manner described; and it need not be affixed to its support in the manner hereinafter set forth.

In the accompanying drawing:

Fig. 1 is a perspective view of a plate adapted to support the bearings of the present invention.

Fig. 2 is a similar view of the same provided with a bearing made in accordance with the present invention.

Fig. 3 is an enlarged fragmentary view of the aforesaid illustrative embodiment of the present invention.

Fig. 4 is a vertical sectional view taken along line 4—4 of Fig. 3.

Fig. 5 is a view similar to Fig. 3 taken from the other side of the plate carrying the bearing, and Fig. 6 is a fragmentary view of the invention looking downwardly from the top of Fig. 3.

Referring now more in detail to the aforesaid illustrative embodiment of the bearings of the present invention and with particular reference to the drawing illustrating the same, numeral 10 generally designates a plate adapted to receive the bearing of the present invention. It is, of course, obvious that the bearings of the present invention may be applied to any support on which it is desired to rotatably mount a shaft, and the plate itself is no part of the present invention. The plate illustrated is used to support the movement of an electric clock and the bearings of the present invention are particularly adapted to receive the rotor shaft of the synchronous motor of such clock, but, as already stated, the bearings of the present invention are not limited to this application. The plate 10 or other support adapted to receive the bearings of the present invention is provided with a substantially circular opening 11 from which diverge, as tangents, slots 12. The opening 11 and slots 12 together present a substantially V-shaped aperture at the plate 10. In order to receive the bearings of the present invention, it is, of course, necessary to prepare the supporting member with the openings just described.

After the plate 10 has been so prepared, it has affixed thereto by a casting process, well known in the art and therefore not necessary to here describe, the bearing 13. Such bearing comprises generally a substantially V-shaped wall 14 from the lower or closed end and side edges of which extend a continuous bottom and side wall 15, by means of which the wall 14 is maintained in spaced relation with the plate 10 to present a cup 13'. The wall 15 is of substantially the same thickness as the wall 14 immediately adjacent the latter but is widened at the base 16 to overlap the opening 11 and slots 12 of the plate 10 to prevent the bearing 13 from passing through the plate apertures.

Formed with the wall 15 at the lower end thereof, is a hub 17 which is adapted to fit into the opening 11 in the plate 10. The hub 17 is stepped as at 18 and is provided with a flange 19 which is adapted to overlap the opening 11 on the side of the plate 10 opposite to that which is provided with the bearing 13, so that the whole is retained upon the plate 10 by the overlapping base 16 of the wall 15 on one side of the plate and the overlapping flange 19 on the other side.

The hub 17 and its stepped portion 18 are provided with a continuous bore 20 and the wall 14 is provided with a boss 21 having a bore 22 in register with the bore 20. The bores 20 and 22 thus present a bearing for a shaft 23, which is rotatably mounted therein.

In order to keep the shaft 23 properly lubricated, I provide the cup 13' formed by the walls 14 and 15 of the bearing 13 and the adjacent portion of the plate 10 with a piece of felt 24 which may be saturated with oil.

This completes the description of the aforesaid illustrative embodiment of the bearings of the present invention. It will be noted, however, that I have thus provided an inexpensive and yet highly efficient bearing the uses of which are innumerable. Other objects and advantages of the devices of the present invention will be obvious to those skilled in the art to which the present invention relates.

What I claim my invention is:

1. In combination with a supporting plate provided with an opening therein, a unitary bearing and oil cup cast on the plate, said bearing and cup comprising front and side walls affixed to the plate by overlapping the side walls on one side of the plate opening, and a bearing hub integrally formed with said side walls and extending through the plate opening and overlapping the same on the opposite side.

2. In combination with a supporting plate having an opening therein, a unitary cup-like receptacle and bearing hub cast on the plate, said receptacle overlapping the plate opening on one side thereof and said hub overlapping the plate opening on the other side thereof.

JOSEPH GOTTLIEB.